UNITED STATES PATENT OFFICE.

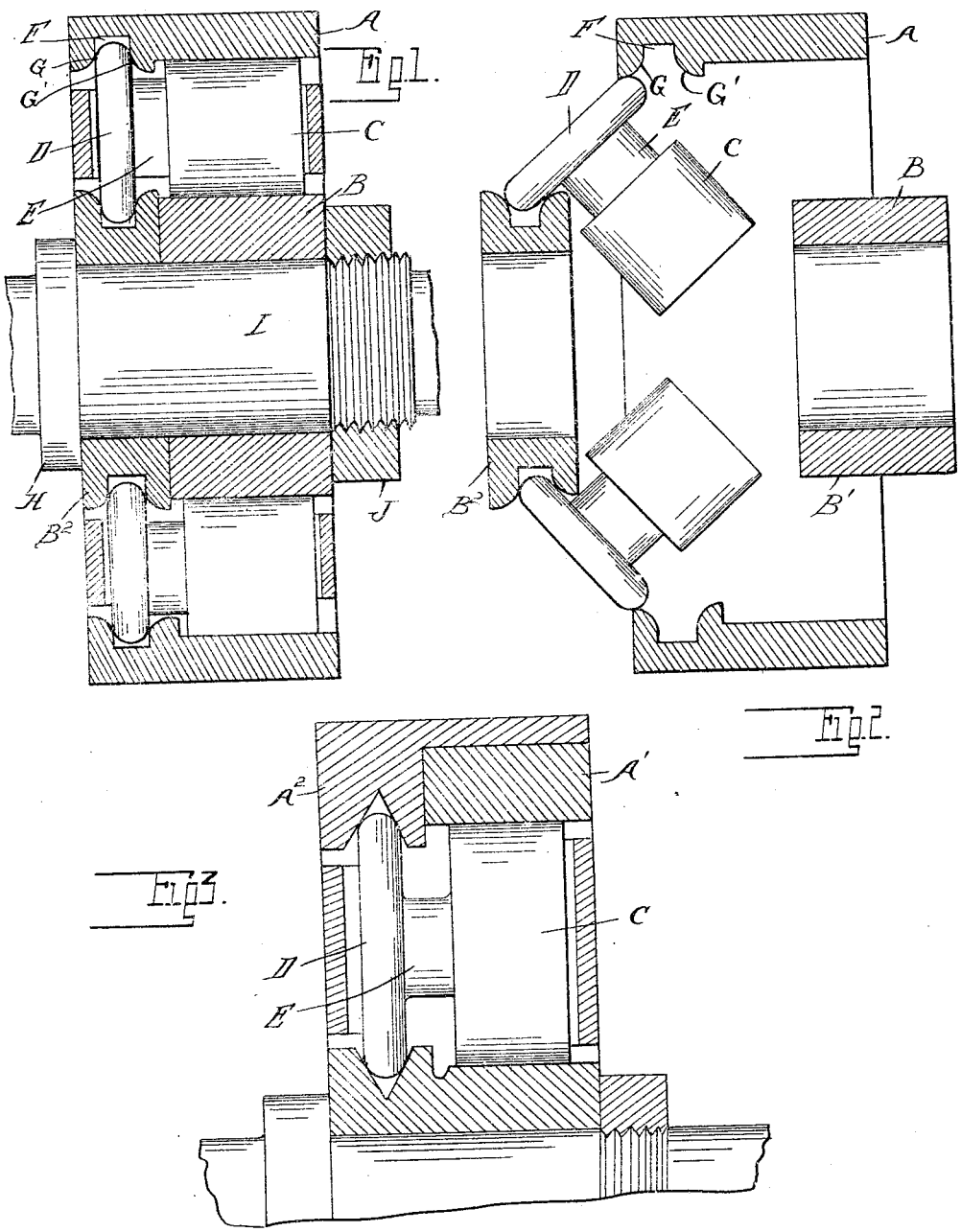

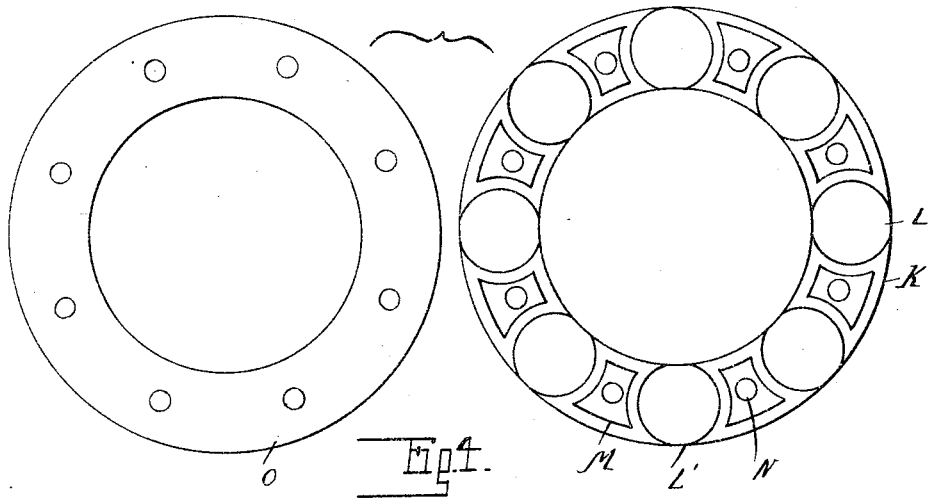
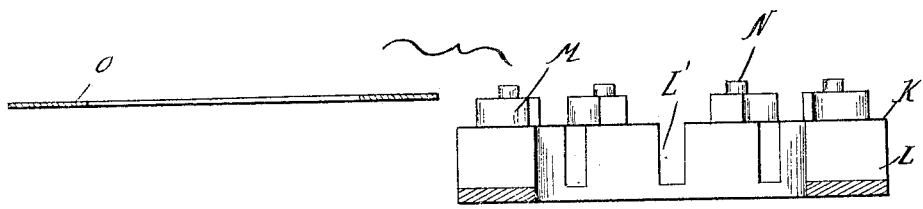

HENRY L. BOCK, OF TOLEDO, OHIO, ASSIGNOR TO WILLIAM EMIL BOCK, OF TOLEDO, OHIO.

ROLLER-BEARING.

1,138,180.  Specification of Letters Patent.  Patented May 4, 1915.

Application filed June 28, 1913. Serial No. 776,272.

*To all whom it may concern:*

Be it known that I, HENRY L. BOCK, a citizen of the United States of America, residing at Toledo, in the county of Lucas and State of Ohio, have invented certain new and useful Improvements in Roller-Bearings, of which the following is a specification, reference being had therein to the accompanying drawings.

The invention relates to roller bearings designed to carry both radial and end thrust loads, and has particular reference to the peculiar construction of parts which permits of easily manufacturing and assembling the same.

It is also an object of the construction to maintain the same ratio of speed between all contacting parts of the bearing.

In the drawings: Figure 1 is a longitudinal section through one construction of my bearing, and Fig. 2 is a similar view showing the manner of assembling the parts; Fig. 3 is a view similar to Fig. 1 showing a modified construction; and Figs. 4 and 5 are respectively a plan and central section of a cage construction for separating the rolls.

In the construction shown in Fig. 1, A and B are concentric cylindrical race members, between which are placed cylindrical rolls C. D are enlarged heads at one end of each of the rolls C and separated from the cylindrical portion thereof by a groove E. F are grooves in the race members A and B for receiving the heads D, which grooves have opposed rounded or beveled bearing faces G and G' which contact with the rounded heads D in line with the periphery of the cylindrical roll. Thus the ratio of speed between the cylindrical portion of the rolls and their race members is the same as between the end thrust portions of said rolls and race members.

To permit of assembling the parts, it is necessary to remove one of the cylindrical race members during the engagement of the enlarged heads with the grooves F. As shown in Fig. 2, this is accomplished by forming the inner race member B with a cylindrical sleeve portion B' and a grooved portion B² separable therefrom. This permits of engaging the rolls by arranging them in angular position, as shown in Fig. 2, in which position the enlarged heads may be entered within the outer race member A, and endwise movement will then cause the rolls to be turned into parallel relation to the axis of the race member, after which the removable cylindrical portion B' of the race member B may be inserted to form the radial thrust bearing. The portions B' and B² are normally secured to each other by suitable means such as the collar H on the shaft I which engages the member B², while a clamping nut J engaging a threaded portion of the shaft is used for clamping the portion B' to the portion B².

With the construction shown in Fig. 3, the same effect is obtained by forming the inner race member with its grooved portion and cylindrical portion integral, while the outer race member is formed of separable portions A' and A². The portion A' is cylindrical and is longitudinally engageable with a recess in the member A², as shown, this permitting of first arranging the rolls in inclined position to engage the enlarged heads with the grooves and then, by inserting the member A', holding said rolls from disengagement.

To hold the rolls properly spaced in relation to each other, a suitable cage construction is employed, such as shown in Figs. 4 and 5, in which K is an annular member of slightly lesser cross section than the rolls and having cylindrical recesses L therein to receive said rolls. The recesses L provide open slots L' upon opposite sides thereof, through which a small segment of the roll extends into contact with the outer and inner race members. The cage is further provided with portions M cut away sufficiently to receive the enlarged heads of the rolls, and pins N projecting outward from the portions M serve to connect the same with a ring member O.

When the parts are assembled, as shown in Figs. 1 and 3, thrust will be taken by the bearing both radial and endwise, and without the contacting of any surfaces having differential speed ratios.

What I claim as my invention is:

1. A roller bearing, comprising a series of rolls provided with enlarged heads forming end thrust bearing surfaces, inner and outer grooved end thrust bearing members spaced from each other when concentrically arranged by less than the diameter of said enlarged ends, said enlarged heads being of a size to be engageable with said grooved members when the former are in oblique position, and annular portions of the race members for engaging the radial load sustaining portions of said rolls and holding the axes thereof in parallelism.

2. A roller bearing, comprising a series of rolls provided with enlarged heads forming end thrust bearing surfaces, inner and outer concentric race members for engaging said rolls spaced from each other by less than the diameter of said enlarged heads and provided with grooves for receiving said heads, said enlarged heads being engageable with said grooves when in different planes and the axes of the rolls being obliquely arranged, and a radial thrust race member portion separable from one of said grooved member portions to permit the oblique arrangement of said rolls and normally holding said rolls in parallelism.

3. A roller bearing, comprising a series of rolls provided with enlarged heads forming end thrust bearing faces, inner and outer grooved race members spaced from each other by less than the diameter of said enlarged heads, said enlarged heads being of a size to be engageable with said grooved race members by an endwise movement of the heads when the axes of the rolls are obliquely arranged, a radial thrust portion integral with one of said grooved members, and a radial thrust portion separable from the other of said grooved members to permit the oblique arrangement of said rolls and normally holding the latter in parallelism.

4. A roller bearing, comprising a series of rolls provided with enlarged heads forming end thrust bearing faces, inner and outer grooved race members spaced from each other by less than the diameter of said enlarged heads, said heads being of a size to be engageable with said grooved race members by a relative endwise movement when the axes of the rolls are obliquely arranged, a radial load-carrying race portion integral with one of said grooved members, a radial load portion separable from the other of said grooved members to permit of the oblique arrangement of said rolls, and clamping means for holding said separable radial portion to its corresponding grooved member to normally hold the same from relative movement and to retain said rolls in parallelism.

5. A roller bearing, comprising a series of cylindrical rolls provided with enlarged heads having oblique end thrust bearing faces, inner and outer grooved race members spaced from each other by less than the diameter of said enlarged heads, said enlarged heads being of a size to be engageable with said grooved race members by a relative endwise movement of said members when the axes of said rolls are obliquely arranged, a radial load-thrust portion integral with the outer one of said grooved members, a radial load portion separable from the inner one of said grooved members to permit of the oblique arrangement of said rolls, a shaft on which said separable radial load portions and grooved member are mounted, and clamping means for holding said members adjacent and in fixed relation upon said shaft.

6. A roller bearing, comprising a series of cylindrical rolls having enlarged heads forming end thrust bearing faces, inner and outer grooved race members spaced from each other by less than the diameter of said enlarged heads, said heads being of a size to be engageable with said grooved race members by a relative endwise movement of said members when the axes of the rolls are obliquely arranged, inner and outer radial load carrying race member portions for engaging the cylindrical portions of said rolls, one of said race member portions being separable from the grooved race member portion to permit of the angular arrangement of said rolls, means for holding said separable members normally adjacent to each other, and a cage member for spacing said rolls insertible endwise between the same and between said inner and outer race members.

In testimony whereof I affix my signature in presence of two witnesses.

HENRY L. BOCK.

Witnesses:
JAMES P. BARRY,
DELBERT COLLINS.